Dec. 25, 1962
E. O. McKINNEY ET AL
3,069,890
MAGNETIC KEY HOLDER
Filed Feb. 26, 1959
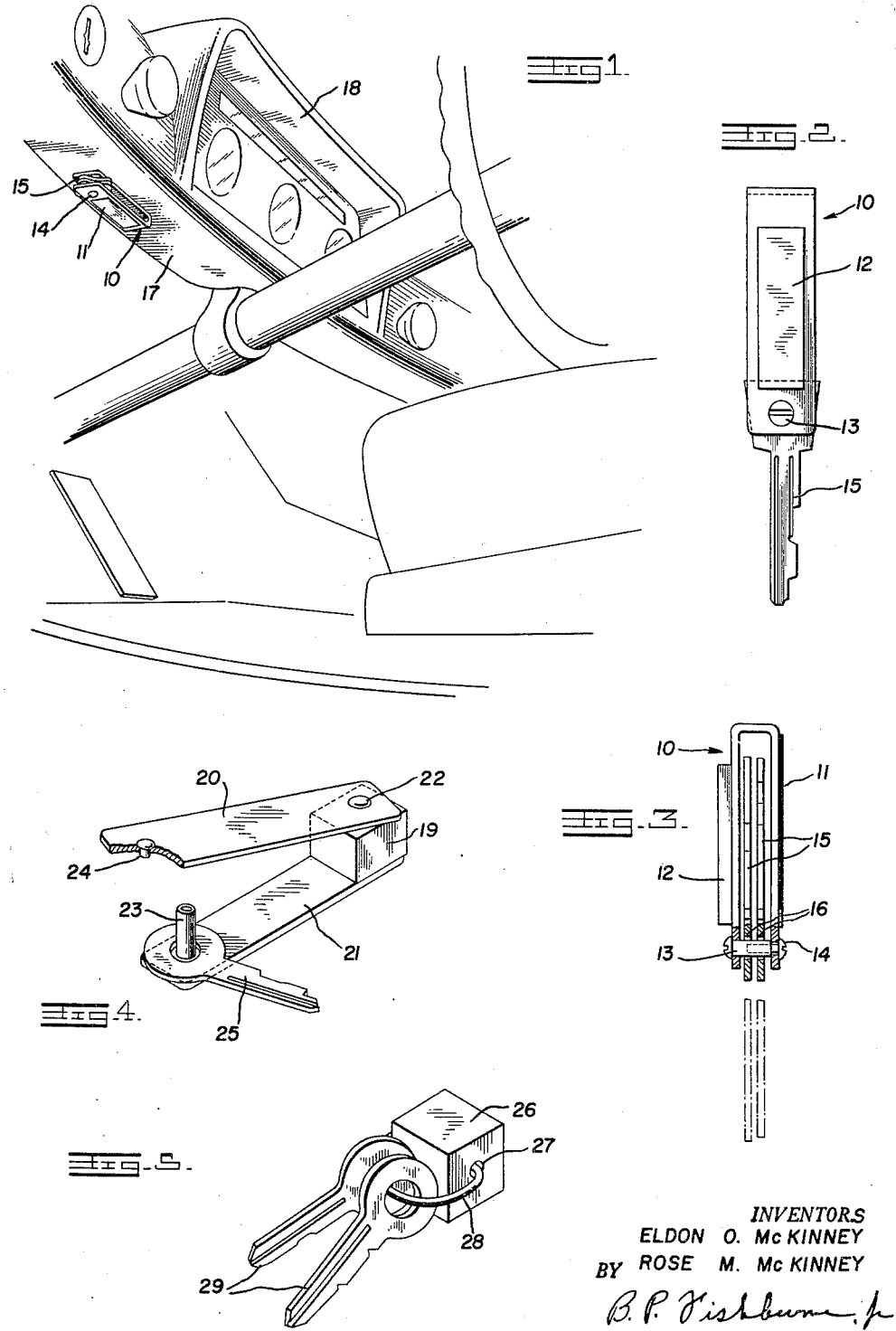
INVENTORS
ELDON O. McKINNEY
BY ROSE M. McKINNEY
ATTORNEY 3,069,890
MAGNETIC KEY HOLDER
Eldon O. McKinney and Rose M. McKinney, both of 210 W. Sunny Dunes Road, Palm Springs, Calif.
Filed Feb. 26, 1959, Ser. No. 795,779
2 Claims. (Cl. 70—456)

Our invention relates to magnetic holding devices, and more particularly to key holders having permanent magnet parts for supporting keys of automobiles and the like by magnetic attraction between the key holder and some steel or other paramagnetic member of the automobile.

A primary object of the invention is to provide a key holder or key ring ornament formed at least in part from a permanent magnet, thereby enabling the driver of an automobile to place the key and key holder in a concealed position beneath the instrument panel or the like when leaving the automobile and after locking the ignition, and having the key holder supported in such concealed position by magnetic attraction between the key holder and instrument panel.

A further object of the invention is to provide means of the above-mentioned character which is highly simplified in construction, cheap to manufacture and useful for securing keys by magnetic attraction to various members formed of paramagnetic material.

Other objects and advantages of the invention will become apparent during the course of the following description.

In the accompanying drawings forming a part of this application and in which like numerals are employed to designate like parts throughout the same, FIGURE 1 is a fragmentary perspective view showing a portion of an automobile instrument panel with a key holder in accordance with the invention secured thereto in a concealed position by magnetic attraction.

FIGURE 2 is a side elevation of the key holder shown in FIGURE 1 on an enlarged scale.

FIGURE 3 is a further side elevation of the key holder taken at right angles to FIGURE 2 and with the keys in the enclosed or inactive position.

FIGURE 4 is a fragmentary perspective view of a modified form of key holder according to the invention.

FIGURE 5 is a perspective view of a further modified form of key holder.

In the drawings, wherein for the purpose of illustration are shown preferred embodiments of the invention, attention is directed to FIGURES 1–3 inclusive, wherein the numeral 10 designates a generally U-shaped key holder body portion adapted to serve as a partial enclosure for one or more keys, FIGURE 3, and also as a handle for a key when the same is extended to the active position as in FIGURE 2. The body portion 10 is preferably formed of some non-magnetic material such as brass or the like, or it may be formed of plastics material or any other material which is stiff or rigid. Secured to the outer face of one side of the body portion 10 by any suitable means is a plate 11, adapted to serve as an ornament or to carry visible indicia such as an automobile license number, a person's name or the like. Similarly secured to the outer face of the other side of the body portion 10 is a preferably elongated permanent magnet plate 12. The plate 11 and permanent magnet 12 are rigid with the body portion 10 and permanently attached thereto in any preferred manner.

The sides of the key holder body portion 10 are suitably apertured near their free ends and beyond the plate 11 and magnet 12 for the reception of a tubular nut 13 and screw 14, FIGURE 3, which together constitute a pivotal support for keys 15, having openings 16 in their heads which receive the tubular nut 13. As shown in FIGURES 2 and 3, the keys 15 may extend beyond the free ends of the key holder body portion sides, or the keys may be partially enclosed within the key holder body portion as desired.

When the key holder of FIGURES 2 and 3 is used in conjunction with the ignition key of an automobile, the driver may park the automobile and lock the ignition and then place the key holder and keys beneath the lower horizontal ledge 17 of the automobile instrument panel 18 as shown in FIGURE 1. When this is done, the permanent magnet 12 is arranged uppermost for direct contact with the steel ledge 17 of the instrument panel, and the key holder will be instantly secured thereto by magnetic attraction between the magnet 12 and the steel ledge 17.

In this manner, the automobile keys are supported in a convenient place to be later grasped by the driver upon re-entering the automobile and the keys are concealed from anyone who might enter the automobile while the driver is absent. The arrangement is particularly useful and convenient in instances where the driver is parking for a short time and does not wish to lock the doors and take the keys with him when leaving the automobile. There is also no chance of misplacing or losing the automobile keys when they are secured by magnetic attraction beneath the instrument panel ledge 17 or some other steel surface of the vehicle which will support them in a safe and concealed manner. The driver and no one else will know exactly where to reach for the keys upon returning to the automobile. While the arrangement is not recommended for use during overnight or long parking periods, it may be so used if desired. Also, the magnetic key holder is in no sense limited to use with automobile keys or with any particular supporting part of the automobile such as the instrument panel ledge 17, and the device is obviously capable of a wide variety of applications with different types of keys and different forms of paramagnetic attracting or supporting members.

In FIGURE 4, there is shown a modified form of key holder comprising a permanent magnet block or element 19 having pivotally secured thereto on opposite sides of the same a pair of plates 20 and 21, preferably formed of brass, plastics material or the like. The numeral 22 designates a rivet or other suitable pivot element used to permanently pivotally secure the side plates 20 and 21 to the permanent magnet 19.

It may thus be seen that the elements 20, 21 and 22 in FIGURE 4 constitute a generally U-shaped key holder body portion similar to the U-shaped body portion 10 in FIGURE 3, and the elements 20, 21 and 22 are permanently interconnected, as stated, and this also corresponds broadly to the construction in FIGURE 3.

The plate 21 has rigidly secured to its forward end a tubular element 23 which extends at right angles thereto. A pin or detent 24 is fixedly secured to the forward end of the opposite plate 20 and projects somewhat inwardly of the same. The plate 20 is resilient, and when the same is shifted into overlying parallel relation with the plate 21, the detent 24 will snap into the bore of the element 23 for detachably securing the two plates 20 and 21 in closed relation. A key 25 or keys is received by the element 23 of plate 21 as shown in FIGURE 5. The key 25 is preferably freely pivoted upon the tubular element 23 so that the key holder of FIGURE 4 may be used in much the same manner as the key holder of FIGURES 2 and 3.

The coacting elements 23 and 24 in FIGURE 4 correspond to the elements 13 and 14 in FIGURE 3, and together, in both forms of the invention, constitute separable two-part pin means for supporting keys and being engageable through the apertures commonly found in the heads of keys.

It should be obvious in view of what has been said previously that the key holder of FIGURE 4 may be secured by magnetic attraction to the instrument panel ledge 17 or to any other suitable paramagnetic member as desired. The permanent magnet element 19 will be readily attracted to the ledge 17 by merely placing the key holder in contact therewith.

In FIGURE 5, a further modified form of key holder or key ring ornament is illustrated. The numeral 26 designates a permanent magnet block or element having a bore 27 to receive a wire key ring 28 carrying keys 29 which may be automobile keys or the like. The permanent magnet 26 may be formed in other desired shapes, if preferred, or it may be substantially cubical as shown.

The permanent magnet 26 may serve to support the keys 29 by magnetic attraction upon the instrument panel ledge 17 or upon some other suitable supporting member of paramagnetic material.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described our invention, we claim:

1. A holder for keys comprising a permanent magnet member, a pair of non-magnetic plates arranged upon opposite sides of said member and projecting beyond one face thereof, an element serving to pivotally connect said plates to said member, a tubular element secured to one of said plates near its end remote from said magnet member and extending at right angles thereto, and a detent element fixedly secured to the corresponding end of the other plate and adapted to enter the bore of the tubular element when said other plate is arranged parallel to said one plate and in overlying relation therewith, said tubular element adapted to support a key or keys.

2. A holder for keys comprising a permanent magnetic block, a pair of non-magnetic plates engaging the opposite faces of said block and projecting longitudinally beyond the same, means to attach said plates to said block, one plate being resilient, a tubular element arranged between said plates and secured to one plate, and a pin secured to the other plate and adapted for insertion within the end of the tubular element.

References Cited in the file of this patent

UNITED STATES PATENTS

| | | |
|---|---|---|
| 1,579,153 | Seeler | Mar. 30, 1926 |
| 1,859,176 | Servilla | May 17, 1932 |
| 2,245,381 | Biggs | June 10, 1941 |
| 2,589,349 | Diefenbach | Mar. 18, 1952 |